June 11, 1968 — N. H. KEMP — 3,387,738
CLOSURE SEAL
Filed Oct. 8, 1965
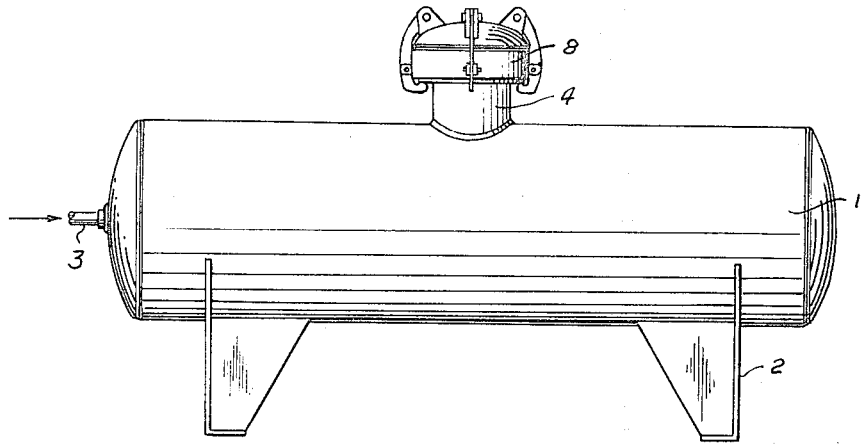
Fig. I
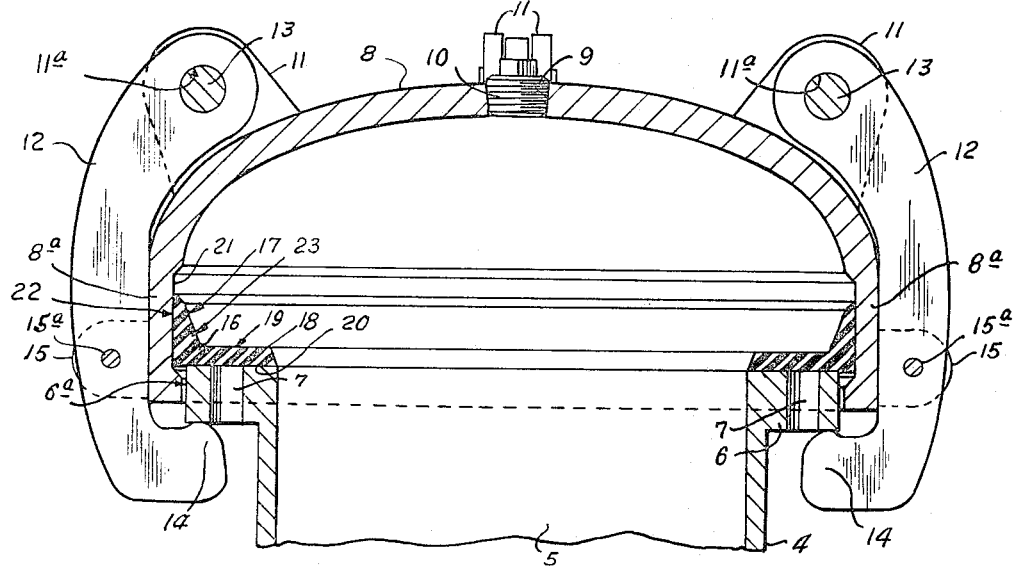
Fig. III
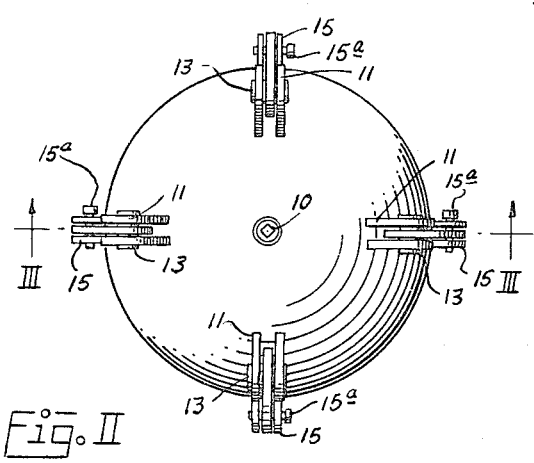
Fig. II
INVENTOR
Norman H. Kemp
BY Howard E. Moore
ATTORNEY

United States Patent Office 3,387,738
Patented June 11, 1968

3,387,738
CLOSURE SEAL
Norman H. Kemp, 1232 E. Farnham Court,
Irving, Tex. 75060
Filed Oct. 8, 1965, Ser. No. 494,061
12 Claims. (Cl. 220—46)

This invention is concerned with a method and means for closing pressure vessels to determine whether there are leaks therein, or whether they will withstand specified internal pressures without rupturing or leaking.

Pressure vessels, such as tanks for storing and transporting liquids and gases under pressure must meet certain standards, as specified by regulatory authorities and users as to internal pressure to which they can be subjected without rupturing or leaking, inasmuch as many of the liquids and gases stored and transported therein are of volatile, noxious, flammable, and explosive character. Such internal pressure test must be carried out by the manufacturer as a safety precaution, to comply with the rules of regulatory authorities and to meet the requirements of carriers and users.

Difficulty has been encountered in the past in the carrying out such testing operations due to the difficulty of properly sealing the opening or openings in the tank or other container during such testing operation.

In some instances a cover or cap has been welded over the opening while testing, and the cap was cut off, as by a torch after the test has been made.

Another method was to drill holes in the upper surface of the tank about the flange or surface extending about the opening and attach a cover with a flat seal ring between same and the flange or surface about the opening. Such means of sealing for testing was unsatisfactory because of the difficulty of uniformly compressing the seal about the bolt hole openings and by reason of the non-uniform extrusion of the seal material between the surfaces.

In short, such prior practices of compressing a resilient seal between a plate and a tank or flange surface is generally unsatisfactory because the use of a multiplicity of bolt holes provides numerous points for leakage, the unequal torque on screws provides leakage points such as bad hole patterns in gaskets. Moreover, the installation and use of such devices is not only time consuming but is expensive and unreliable.

Applicant has overcome these problems by providing only one test opening in the tank which is positively closed by a uniform sealing surface actuated by internal pressure injected into the pressure vessel for testing purposes.

It is, therefore, a primary object of the invention to provide a closure and seal over and about an opening in a pressure vessel, or other container, wherein the seal is actuated and uniformly applied by injecting pressure into the pressure vessel, container or conduit, to positively close the opening, and wherein the greater the injected pressure the tighter the seal is applied.

Another object of the invention is to provide means for sealing about an opening in a pressure vessel, container or conduit, which may be easily and quickly applied over and about the opening, and which may be easily and quickly removed therefrom.

Still another object of the invention is to provide means for sealing over and about an opening into a pressure vessel or container to be tested which is adaptable and conformable to different types of openings, i.e., openings through an extension or standpipe secured about the opening of the tank or openings through the wall of the pressure vessel.

Still another object of the invention is to provide a method and means of sealing and closing about an opening in a pressure vessel, container or conduit, which is adaptable to different sizes and shapes of openings, and which may be attached over and about the opening in various ways.

A still further object of the invention is to provide a seal for closing a passage through the wall of a pressure vessel, said seal having a lower surface conformable to the surface about the opening and arranged to close bolt holes provided through the wall of the tank about the opening or through a flange provided about the opening.

Another object of the invention is to provide such a closure and seal member for sealing about an opening provided through the wall of a pressure vessel or container being tested, or about a conduit, said seal having angularly disposed flanges thereon, one of which seals about the opening in response to internal pressure within the pressure vessel, container or conduit, and the other of which seals against the inner wall of the closure cap or shell in response to internal pressure exerted within the pressure vessel, container or conduit, to thereby provide a positive and uniformly applied seal which is quickly and easily applied.

Other and further objects of the invention will become apparent upon reading the detailed specification hereinafter following and by referring to the drawing annexed hereto.

A suitable embodiment for the practice of the invention is shown in the attached drawing wherein, FIGURE I is a side elevational view of a typical tank or pressure vessel through which my closure and seal member is attached about the opening therein, FIGURE II is a top plan view of the cap; and FIGURE III is a cross-sectional elevational view of the cap and seal assembly attached over a flanged opening in the pressure vessel, said view being taken on the line III—III of FIGURE II.

The pressure vessel 1 may be supported on suitable legs or supports 2.

The tank or pressure vessel 1 has an inlet connection 3 in one end thereof through which same is normally filled, and to which a suitable source of liquid or gas pressure may be attached for injection thereinto for the purpose of testing the walls of the tank 1 against leaks or ruptures.

The tank 1 may include a cylindrical standpipe 4 providing an opening 5 therefrom. Such standpipe is normally provided on pressure vessels used for storing and dispensing liquified petroleum gas, such as butane or propane, and normally includes an annular flange 6 about the upper end thereof through which are provided spaced stud receiving holes 7 for attachment to a corresponding flange on a control head (not shown) mounted above same. Such control head normally provides a mounting for dispensing outlet, control valves, a pressure gauge, safety valve and other control devices normally required in connection with such equipment. Other connections than a control head could be attached to the flange 6, such as a conduit having a corresopnding flange thereon which is attached by a sealed connection to the flange 6.

It will be further understood that such type of outlet is merely for illustration purposes and that the invention described and claimed herein can be employed with different types and shapes of tank outlets, such as an outlet provided directly in the wall of the tank without a standpipe 4 thereabout.

A dome-shaped cover 8 has a threaded passage 9 in the upper side thereof which is normally closed by a threaded plug 10. The passage 9 provides an opening for bleeding or flushing air out of the tank before it is closed for testing. After the tank is thus flushed out the plug 10 may be threaded in the passage 9 to provide a leakproof closure during the testing operation.

The dome-like cover 8 includes an annular downwardly extending skirt portion 8a which has formed on its inner side an annular recess 21, having a smooth surface. The recess 21 receives the seal ring 16 and prevents it from falling out while cap 8 is being placed over the opening, while the cap is being transported, or is in storage. Preferably the surface of the recess 21 is machined and finished to provide the smooth surface for receiving the seal hereinafter described.

Furthermore, it will be noted that the width of recess 21 is greater than the width of flange 17 of seal 16 so that the seal can move up and down and act as a piston in response to variations of pressure within the dome 8.

A plurality of pairs of spaced attachment ears 11 are secured to the upper surface of the cover 8 so as to extend upwardly and outwardly thereof.

Attachment arms 12 are pivotally attached at their upper ends between the pairs of ears 11 by means of pivot pins 13, which pass through aligned holes 11a provided through the pairs of ears 11. The arms 12 may thus be pivoted upwardly about the pivot pins 13.

Each of the arms 12 is turned inwardly at its lower end to provide a hook member 14, said hook members being arranged to pass underneath the flange 16 when the arms are swung downwardly, with the inner surfaces thereof engaging the outer surface of the skirt 8a.

Pairs of spaced guide ears 15 are secured to the outer surface of the skirt portion 8a of the cover 8 in position to receive therebetween the arms 12 when swung downwardly to the position shown in FIGURE III. The arms 12 are thus positioned against lateral movement. The arms 12 are secured against outward movement by means of pull pins 15a which may be extended through aligned passages in the guide ears 15 and the arms 12.

The arms 12 or other attachment members should be spaced equidistantly about the periphery of the opening 5. Preferably there should be at least four such spaced arms 12 in order to provide uniform sealing about the passage but such seal could be provided by two or more of such attachment arms spaced equidistantly thereabout.

A special seal ring, generally indicated at 16, is provided in conjunction with the cover 8, said seal ring being made of resilient material such as a neoprene or rubber compound and includes an upwardly extending annular lip 17 and an inwardly extending flange 18, said lip 17 and flange 18 being preferably, but not necessarily disposed in right angular relationship with reference to their outer surfaces. The flange 18 could be provided with reinforcement to prevent undue extrusion through holes 7 and to make it stiffer than lip 17. The seal ring 16 might also be made of flexible, relatively pliable metal or other material which would provide a seal, such as aluminum, asbestos composition, Teflon, and the like.

In the form shown in FIGURE III the flange 18 is of sufficient width to cover the stud receiving passages 7 and provide a seal thereover and is preferably wide enough to compensate for any extrusion of material of the seal into the passages 7. The lower surface 20 of the flange 18 is flat and coincides with the upper surface of the flange 6 so as to be in continuous contact therewith about the flange 6.

The outer surface 22 of the lip 17 is preferably flat and closely conforms to the inner surface of the recess 21 provided on the inner side of the skirt 8a.

It will be noted that the lower surface 20 of the seal member extends across the space 6a between the outer surface of the flange 6 and the inner side of the lower end of the skirt 8a so that the resilient material of the seal member may be extruded into such passage to seal and close same when pressure is applied thereagainst as hereinafter described.

The operation and function of the seal and closure member hereinbefore described is as follows:

The cover or dome 8 is placed over the passage 5 with the seal mounted in recess 21. The lower surface 20 of the seal 16 is engaged with the upper surface of the flange 6.

The arms 12 are swung downwardly to engage the hook ends 14 with the lower surface of the flange 6. The draw pins 15a are inserted through the aligned passages in the guide ears 15 and arms 12 to retain the arms in inward position. It will be noted that this operation is quickly, simply, and easily carried out without the necessity of tools, welding or other means for attachment of same.

The plug 10 is removed to flush out air from the tank after the injected pressure fluid is connected with the inlet conduit 3. The plug is then replaced and the liquid or gas pressure is applied to the interior of the tank through the inlet passage 3 to test same.

Such injected pressure acts on the upper surface 19 of the seal 16 and on the inner surface 23 of the lip 17 to force the lower surface 20 of the flange 18 against the upper surface of the flange 6, and the outer surface 22 of the lip 17 against the inner surface of the groove 21 to press such surfaces into sealing engagement.

The greater the pressure applied internally of the pressure vessel the more positive and secure the seal is. It will be noted that the seal is uniformly applied along both the surface 20 and surface 22 to provide a uniform seal without areas for leakage. It will be noted that the seal also closes the stud receiving passages 7 and is extruded into the annular gap 6a between the flange 6 and the inner edge of the skirt 8a to provide a firm and secure seal about the opening.

Other types of attachment of dome 8 about an opening could be provided. For instance, appropriate cables or wires could be attached thereto and extended about the pressure vessel 1 or attached externally to temporarily hold the seal 16 downwardly about the passage. Furthermore, the passage does not necessarily have to be a flanged passage but could be a passage flush with the wall of the tank and the seal would likewise conform to the curvature of the tank and provide a seal thereabout.

The passage into the tank could also be of other shapes, such as oval, hexagonal, or other shapes, and the shape of the seal ring and cap could be made to conform thereto.

In employing the dome 8 on a tank wherein no standpipe existed about a passage flush with the wall of the tank it will simply be necessary to provide a cover having a skirt shaped and formed to conform to the curvature of the tank. The same seal 16 could be employed because it is of electric material and would conform to the curvature of the tank about the passage and within the inner surface of the flange 8a. When used to test a tank having no standpipe thereon and wherein the passage is flush with the wall of the tank the cover 8 could be held thereto by means of wires or cables extending about the tank or tied to external objects.

The cover 8 may be quickly removed by simply removing pins 15a and allowing arms 12 to swing free of flange 6.

Although the seal ring is illustrated in connection with a cap to close an opening into a pressure fluid container it, of course, can be employed to close passages into other containers and housings while being tested, such as bomb housings, dispensing cans, petroleum storage tanks, compressor tanks, engine blocks and castings. Such seal ring could also be employed in a conduit coupling so that the pressure within the conduit expands and applies the seal.

Furthermore, although the cap and seal combination is especially adaptable to sealing a passage into a vessel for testing, it could be used as a removable permanent closure for a container to compensate for variations of pressure therein.

It will thus be seen that I have provided a seal and closure for an opening in a pressure vessel, container or conduit, which is simple and easy to attach, provides for a uniform and positive seal thereabout, which is adaptable to different sizes and shapes of openings and openings which are both flush with the wall of the tank and spaced from the wall of the tank, and which is relatively inexpensive and time saving.

It will be understood that other and further embodiments of my invention than those indicated above may be employed without departing from the spirit and scope of the appended claims.

Having described my invention I claim:

1. Means for sealing about a passage comprising, a seal ring receptacle, including an annular skirt portion, a seal ring disposed within the skirt, said seal ring comprised of an outer lip having an outer surface conformable to the inner surface of the skirt, and an inwardly extending flange having a lower surface conformable with the surface about the passage, said seal ring being free of attachment to the skirt and the surface about the passage and being freely movable with respect to the skirt after the receptacle is attached about the passage; and means to attach the receptacle about the passage with the lower surface of the seal in contact with the surface about the passage.

2. The combination called for in claim 1 wherein the passage includes a flange thereabout, and the means for attachment of the receptacle about the passage includes a plurality of arms equally spaced about the receptacle and pivotally attached at their upper ends to the receptacle, and each having a hook on the lower end thereof arranged to extend over and engage the lower surface of the flange about the passage.

3. The combination called for in claim 1 wherein the receptacle is a cover arranged to close the passage.

4. The combination called for in claim 3 with the addition of a removable plug in the wall of the cover.

5. The combination called for in claim 2 wherein the flange about the passage has stud receiving holes therethrough, and the inwardly extending flange of the seal ring extends over the upper ends of said holes.

6. The combination called for in claim 2 with the addition of a plurality of pairs of guide ears, attached to the outer surface of the receptacle, there being one pair in alignment with each of the arms arranged to receive the arms when moved downwardly, and a withdrawable pin attaching said arms between said guide ears.

7. The combination called for in claim 1 with the addition of a recess about the inner side of the skirt arranged to receive the seal ring.

8. The combination called for in claim 7 wherein the recess is wider than the outer lip.

9. An article of manufacture comprising a seal ring made of resilient material having an outer lip and an inwardly turned flange angularly disposed with reference to the outer lip the inwardly turned flange being of stronger construction than the outer lip.

10. The seal ring called for in claim 9 wherein the outer surfaces of the lip and flange are disposed at substantially a right angle.

11. The combination called for in claim 1 wherein the lip is tapered on the inner side toward the outer edge thereof.

12. The combination called for in claim 1 with the addition of a relieved area about the inner side of the skirt arranged to receive the seal ring.

References Cited

UNITED STATES PATENTS

| 2,671,683 | 3/1954 | Heyman et al. | 220—55 |
| 3,248,302 | 4/1966 | Mackin | 220—46 |

FOREIGN PATENTS

| 14,486 | 6/1909 | Great Britain. |

THERON E. CONDON, *Primary Examiner.*

J. B. MARBERT, *Assistant Examiner.*